United States Patent
Jeong

(10) Patent No.: US 11,951,789 B2
(45) Date of Patent: Apr. 9, 2024

(54) ELECTRONICALLY CONTROLLED SUSPENSION SYSTEM FOR ESTIMATING REAR WHEEL ACCELERATION AND METHOD FOR ESTIMATING REAR WHEEL ACCELERATION OF ELECTRONICALLY CONTROLLED SUSPENSION SYSTEM

(71) Applicant: HL MANDO CORPORATION, Gyeonggi-do (KR)

(72) Inventor: Seung Hwan Jeong, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 164 days.

(21) Appl. No.: 17/829,283

(22) Filed: May 31, 2022

(65) Prior Publication Data
US 2022/0379678 A1     Dec. 1, 2022

(30) Foreign Application Priority Data

Jun. 1, 2021   (KR) ........................ 10-2021-0070689

(51) Int. Cl.
*B60G 17/018*     (2006.01)
*B60G 17/016*     (2006.01)

(52) U.S. Cl.
CPC .... *B60G 17/0164* (2013.01); *B60G 2400/106* (2013.01); *B60G 2400/204* (2013.01); *B60G 2400/208* (2013.01)

(58) Field of Classification Search
CPC .......... B60G 17/0164; B60G 2400/106; B60G 2400/204; B60G 2400/208; B60G 2600/11; B60G 2600/70; B60G 2800/70; B60G 2800/91; B60G 17/01908; B60G 17/0182; B60G 17/018; B60G 2400/10
See application file for complete search history.

(56) References Cited

FOREIGN PATENT DOCUMENTS

EP          2985606 A1 *  2/2016 ............. G01C 21/00

* cited by examiner

*Primary Examiner* — Hung Q Nguyen
(74) *Attorney, Agent, or Firm* — Ladas & Parry, LLP

(57) ABSTRACT

Provided is an electronically controlled suspension system for estimating a rear wheel acceleration, which includes: a sensor unit measuring an acceleration value of a front wheel; a storage unit storing the acceleration value of the front wheel; and a control unit electrically connected to the sensor unit and the storage unit, and storing the acceleration value of the front wheel in the storage unit, and estimating the acceleration value of a rear wheel by using the acceleration value of the front wheel, wherein the storage unit has a front wheel acceleration buffer, the front wheel acceleration buffer is constituted by several cells, and the several cells are distinguished by a distance index, and the control unit stores the acceleration value of the front wheel corresponding to the distance index in each of the several cells, and the acceleration value of the rear wheel is estimated as the acceleration value of the front wheel, which is stored in a cell positioned behind a location of the front wheel by a wheelbase distance.

20 Claims, 10 Drawing Sheets

ELECTRONICALLY CONTROLLED SUSPENSION SYSTEM FOR ESTIMATING REAR WHEEL ACCELERATION AND METHOD FOR ESTIMATING REAR WHEEL ACCELERATION OF ELECTRONICALLY CONTROLLED SUSPENSION SYSTEM

CROSS-REFERENCE TO RELATED APPLICATIONS

This application claims benefit and priority to Korean Patent Application No. 10-2021-0070689, filed on Jun. 1, 2021, with the Korean Intellectual Property Office, the disclosure of which is incorporated herein in its entirety by reference.

TECHNICAL FIELD

The present disclosure relates to an electronically controlled suspension system for estimating a rear wheel acceleration and a method for estimating a rear wheel acceleration of the electronically controlled suspension system, and more particularly, to an electronically controlled suspension system for estimating a rear wheel acceleration and a method for estimating a rear wheel acceleration of the electronically controlled suspension system, which compensate an acceleration value of a rear wheel by using a distance based buffer and reflecting vehicle velocity information and vehicle specification.

BACKGROUND

A semi-active suspension system which is a kind of electronically controlled suspension system is a system that enhances a ride comfort and a stability of a vehicle by controlling damping force by using a damper having a variable control valve mounted thereon. In the system, an acceleration sensor is mounted on each of a vehicle body and a wheel in order to estimate a behavior of the vehicle, and in general, the behavior of the vehicle body is estimated by using three acceleration sensors in the vehicle body for cost reduction and a wheel behavior is estimated by using two (e.g., one at each of left and right sides) acceleration sensors on a front wheel in the wheel. In this case, an acceleration value of a rear wheel is estimated by using an acceleration value (a numerical value measured by the acceleration sensor) of the front wheel on the assumption of passing through the same road surface of the front wheel. Since accurately determining the behavior of the vehicle is advantageous for controlling the ride comfort, acceleration estimation performance of the rear wheel with high accuracy is required.

A method for estimating the acceleration value of the rear wheel in an electronically controlled suspension system in related art will be described below with reference to FIG. 1.

FIG. 1 is a diagram briefly illustrating an embodiment of a method for estimating the acceleration value of the rear wheel in the electronically controlled suspension system in the related art.

The method for estimating the acceleration value of the rear wheel in the electronically controlled suspension system in the related art is a scheme that stores the acceleration value of the front wheel in a buffer every time step, and reads and allocates a value of the buffer before a passage time (wheelbase (distance)/vehicle velocity (velocity)) of the rear wheel. Here, the buffer is generally a temporary storage device used for storing data and a temporary storage device storing a numerical value (data) measured by a sensor or various devices.

As illustrated in FIG. 1, in the related art, an assumption is applied in which a time based buffer is used, a size of the acceleration value of the front wheel is allocated as it is, and the vehicle velocity (the velocity of the vehicle) is constantly maintained from a generation time of the acceleration value of the front wheel up to a generation time of the acceleration value of the rear wheel. However, due to a difference in suspension structure and vehicle specification between the front wheel and the rear wheel, an acceleration value generated even though the vehicle passes through the same road surface at the same velocity is shown to be actually different, and a buffer value of a wrong index is read in a situation in which the vehicle velocity is changed, and the acceleration value also depends on the vehicle velocity. Accordingly, in such a situation, a method in related art has a problem in that the acceleration estimation performance of the rear wheel deteriorates.

SUMMARY

Accordingly, in order to solve the problem, the present disclosure has been made in an effort to provide an electronically controlled suspension system for estimating a rear wheel acceleration and a method for estimating a rear wheel acceleration of the electronically controlled suspension system, which can enhance acceleration estimation performance of a rear wheel by using a distance based buffer and reflecting vehicle velocity information and acceleration constants of a front wheel and the rear wheel together with an acceleration value of the front wheel.

However, it is to be understood that the problem to be solved by the present disclosure is not limited to the above objects and may be variously extended without departing from the spirit and scope of the present disclosure.

In order to solve a problem to be solved by the present disclosure, an exemplary embodiment of the present disclosure provides an electronically controlled suspension system for estimating a rear wheel acceleration and a method for estimating a rear wheel acceleration of the electronically controlled suspension system, which includes: use a distance based buffer, stores vehicle velocity information in the vehicle velocity buffer jointly with an acceleration value of a front wheel to compensate an acceleration value of a rear wheel for a vehicle velocity, and reflects a ratio of acceleration sizes of the front wheel and the rear wheel for a vehicle specification to achieve rear wheel acceleration estimation performance with higher accuracy.

The electronically controlled suspension system for estimating a rear wheel acceleration according to the exemplary embodiment of the present disclosure includes a sensor unit, a storage unit, and a control unit.

The sensor unit measures an acceleration value of a front wheel. The storage unit stores the acceleration value of the front wheel. The control unit is electrically connected to the sensor unit and the storage unit, and stores the acceleration value of the front wheel in the storage unit, and estimates the acceleration value of a rear wheel by using the acceleration value of the front wheel.

The storage unit has a front wheel acceleration buffer, the front wheel acceleration buffer is constituted by several cells, and the several cells are distinguished by a distance index.

The control unit stores the acceleration value of the front wheel corresponding to the distance index in each of the several cells, and the acceleration value of the rear wheel is estimated as the acceleration value of the front wheel, which is stored in a cell positioned behind a location of the front wheel by a wheelbase distance.

According to an exemplary embodiment, the control unit estimating the acceleration value of the front wheel, which is stored in the cell positioned behind the location of the front wheel by the wheelbase distance as the acceleration value of the rear wheel is estimating the acceleration value of the front wheel, which is stored in a cell storing the acceleration value at a location acquired by subtracting a distance which is as large as a wheelbase from the cell storing the acceleration value at the current location of the front wheel as the acceleration value of the rear wheel.

According to an exemplary embodiment, in a case where the velocity or the acceleration of the vehicle increases, the control unit stores an acceleration value in a cell corresponding to a middle distance index by performing interpolation.

According to an exemplary embodiment, when the control unit estimates the acceleration value of the front wheel, which is stored in the cell positioned behind the location of the front wheel by the wheelbase distance as the acceleration value of the rear wheel, the acceleration value of the rear wheel is expressed as in [Equation 1] below and calculated by [Equation 1].

$$a_{w,RR} = a_{w,FRT}\text{Buffer}[k_n - \text{Wheelbase}] \quad \text{[Equation 1]}$$

($a_{w,RR}$ represents the acceleration value of the rear wheel, $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer.)

According to an exemplary embodiment, the control unit compensates the estimated acceleration value of the rear wheel by using vehicle velocity information.

According to an exemplary embodiment, the storage unit has a vehicle velocity buffer, the vehicle velocity buffer is constituted by several cells, and the several cells are distinguished by a distance index. The control unit stores a vehicle velocity corresponding to the distance index in each of the several cells. The vehicle velocity information is a vehicle velocity stored in the vehicle velocity buffer, and the acceleration value of the rear wheel which is compensated by the vehicle velocity information is in proportion to the vehicle velocity.

According to an exemplary embodiment, the acceleration value of the rear wheel, which is compensated by the vehicle velocity information is expressed as in [Equation 2] below and calculated by [Equation 2].

$$a_{w,RR} = a_{w,FRT}\text{Buffer}[k_n-\text{Wheelbase}]*\{v_x\text{Buffer}[k_n]/(v_x\text{Buffer}[k_n-\text{Wheelbase}])\} \quad \text{[Equation 2]}$$

($a_{w,RR}$ represents the acceleration value of the rear wheel, $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer, $v_x\text{Buffer}[k_n]$ represents the vehicle velocity of the front wheel, which is stored in the $k_n$-th cell storing the vehicle velocity at the current location of the front wheel in the vehicle velocity buffer, and ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer.)

According to an exemplary embodiment, control unit compensates the acceleration value of the rear wheel compensated by the vehicle velocity information by using a vehicle specification According to an exemplary embodiment, the acceleration value of the rear wheel which is compensated by the vehicle velocity information is in proportion to an acceleration constant, wherein the acceleration constant is an acceleration size ratio of the front wheel and the rear wheel.

According to an exemplary embodiment, the acceleration value of the rear wheel, which is compensated by the vehicle specification is expressed as in [Equation 3] below and calculated by [Equation 3].

$$a_{w,RR} = a_{w,FRT}\text{Buffer}[k_n-\text{Wheelbase}]*\{v_x\text{Buffer}[k_n]/(v_x\text{Buffer}[k_n-\text{Wheelbase}])\}*\text{WheelGRatio} \quad \text{[Equation 3]}$$

($a_{w,RR}$ represents the acceleration value of the rear wheel, $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer, $v_x\text{Buffer}[k_n]$ represents the vehicle velocity of the front wheel, which is stored in the $k_n$-th cell storing the vehicle velocity at the current location of the front wheel in the vehicle velocity buffer, ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer, and WheelGRatio represents the acceleration size ratio (acceleration constant) of the front wheel and the rear wheel.)

Provided is a method for estimating a rear wheel acceleration of the electronically controlled suspension system according to another exemplary embodiment of the present disclosure, which includes: a distance based buffer using step.

The distance based buffer using step has a front wheel vehicle velocity buffer, the front wheel vehicle velocity buffer is constituted by several cells, and the several cells are distinguished by a distance index. In addition, an acceleration value of the front wheel corresponding to the distance index is stored in each of the several cells, and the acceleration value of a rear wheel is estimated as the acceleration value of the front wheel, which is stored in a cell positioned behind a location of the front wheel by a wheelbase distance.

According to an exemplary embodiment, in the distance based buffer using step, the acceleration value of the rear wheel is estimated as the acceleration value of the front wheel, which is stored in a cell storing the acceleration value at a location acquired by subtracting a distance which is as large as a wheelbase from a cell storing the acceleration value at a current location of the front wheel.

According to an exemplary embodiment, in the distance based buffer using step, in a case where the velocity or the acceleration of the vehicle increases, an acceleration value in a cell corresponding to a middle distance index is stored by performing interpolation.

According to an exemplary embodiment, in the distance based buffer using step, the acceleration value of the rear wheel is expressed as in [Equation 4] below and calculated by [Equation 4].

$$a_{w,RR} = a_{w,RT}\text{Buffer}[k_n - \text{Wheelbase}] \qquad \text{[Equation 4]}$$

($a_{w,RR}$ represents the acceleration value of the rear wheel in the distance based buffer using step, and $a_{w,RT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer.)

According to an exemplary embodiment, the method further comprises a rear wheel acceleration compensating step based on a vehicle velocity, in which the acceleration value of the rear wheel estimated in the distance based buffer using step is compensated by vehicle velocity information.

According to an exemplary embodiment, the distance based buffer using step has a vehicle velocity buffer, the vehicle velocity buffer is constituted by several cells, and the several cells are distinguished by a distance index. In addition, a vehicle velocity corresponding to the distance index is stored in each of the several cells. The vehicle velocity information is a vehicle velocity stored in the vehicle velocity buffer, and the acceleration value of the rear wheel which is compensated by the vehicle velocity information is in proportion to the vehicle velocity.

According to an exemplary embodiment, in the rear wheel acceleration compensating step based on the vehicle velocity, the acceleration value of the rear wheel, which is compensated by the vehicle velocity information is expressed as in [Equation 5] below and calculated by [Equation 5].

$$a_{w,RR} = a_{w,FRT}\text{Buffer}[k_n-\text{Wheelbase}] * \{v_x\text{Buffer}[k_n] / (v_x\text{Buffer}[k_n-\text{Wheelbase}])\} \qquad \text{[Equation 5]}$$

($a_{w,RR}$ represents the acceleration value of the rear wheel acquired in the rear wheel acceleration compensating step based on the vehicle velocity, $a_{w,FRT}\text{Buffer}[k_n-\text{Wheelbase}]$ represents the acceleration value of the front wheel acquired in the distance based buffer using step, $v_x\text{Buffer}[k_n]$ represents the vehicle velocity of the front wheel, which is stored in the $k_n$-th cell storing the vehicle velocity at the current location of the front wheel in the vehicle velocity buffer, and ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer.)

According to an exemplary embodiment, the method further comprises a rear wheel acceleration compensating step based on a vehicle specification, in which the acceleration value of the rear wheel compensated by the vehicle velocity information in the rear wheel acceleration compensating step based on the vehicle velocity is compensated by vehicle specification.

According to an exemplary embodiment, in the rear wheel acceleration compensating step based on the vehicle specification, the acceleration value of the rear wheel which is compensated by the vehicle velocity information is in proportion to an acceleration constant, the acceleration constant being an acceleration size ratio of the front wheel and the rear wheel.

According to an exemplary embodiment, in the rear wheel acceleration compensating step based on the vehicle specification, the acceleration value of the rear wheel, which is compensated by the vehicle specification is expressed as in [Equation 6] below and calculated by [Equation 6].

$$a_{w,RR} = a_{w,FRT}\text{Buffer}[k_n-\text{Wheelbase}] * \{v_x\text{Buffer}[k_n] / (v_x\text{Buffer}[k_n-\text{Wheelbase}])\} * \text{WheelGRatio} \qquad \text{[Equation 6]}$$

($a_{w,RR}$ represents the acceleration value of the rear wheel acquired in the rear wheel acceleration compensating step based on the vehicle specification, $a_{w,FRT}\text{Buffer}[k_n-\text{Wheelbase}]$ represents the acceleration value of the rear wheel acquired in the distance based buffer using step, $v_x\text{Buffer}[k_n]$ represents the vehicle velocity of the front wheel, which is stored in the $k_n$-th cell storing the vehicle velocity at the current location of the front wheel in the vehicle velocity buffer, ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer, and WheelGRatio represents the acceleration size ratio (acceleration constant) of the front wheel and the rear wheel.)

According to exemplary embodiments of the present disclosure, an electronically controlled suspension system for estimating a rear wheel acceleration and a method for estimating a rear wheel acceleration of the electronically controlled suspension system have acceleration estimation performance of a rear wheel with high accuracy.

A ride comfort and a stability of a vehicle can be enhanced.

However, the effects of the present disclosure are not limited to the above effects and may be variously extended without departing from the technical spirit and scope of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in more detail with reference to the accompanying drawings. A detailed description of a part of the components of the present disclosure which those skilled in the art can clearly understand and easily reproduce by the prior art will be omitted so as not to obscure the gist of the present disclosure.

A semi-active suspension system which is a kind of electronically controlled suspension system is a system that enhances a ride comfort and a stability of a vehicle by controlling damping force by using a damper having a variable control valve mounted thereon. In the system, an acceleration sensor is mounted on each of a vehicle body and a wheel in order to estimate a behavior of the vehicle, and in general, the behavior of the vehicle body is estimated by using three acceleration sensors in the vehicle body for cost reduction and a wheel behavior is estimated by using two (e.g., one at each of left and right sides) acceleration sensors on a front wheel in the wheel. In this case, an acceleration value of a rear wheel is estimated by using an acceleration value (a numerical value measured by the acceleration sensor) of the front wheel on the assumption of passing through the same road surface of the front wheel. Since accurately determining the behavior of the vehicle is advantageous for controlling the ride comfort, acceleration estimation performance of the rear wheel with high accuracy is required.

Hereinafter, an electronically controlled suspension system for estimating a rear wheel acceleration and a method for estimating the rear wheel acceleration of the electronically controlled suspension system according to exemplary embodiments of the present disclosure will be described.

First, the electronically controlled suspension system for estimating a rear wheel acceleration according to the exemplary embodiment of the present disclosure will be described.

Figure 1:
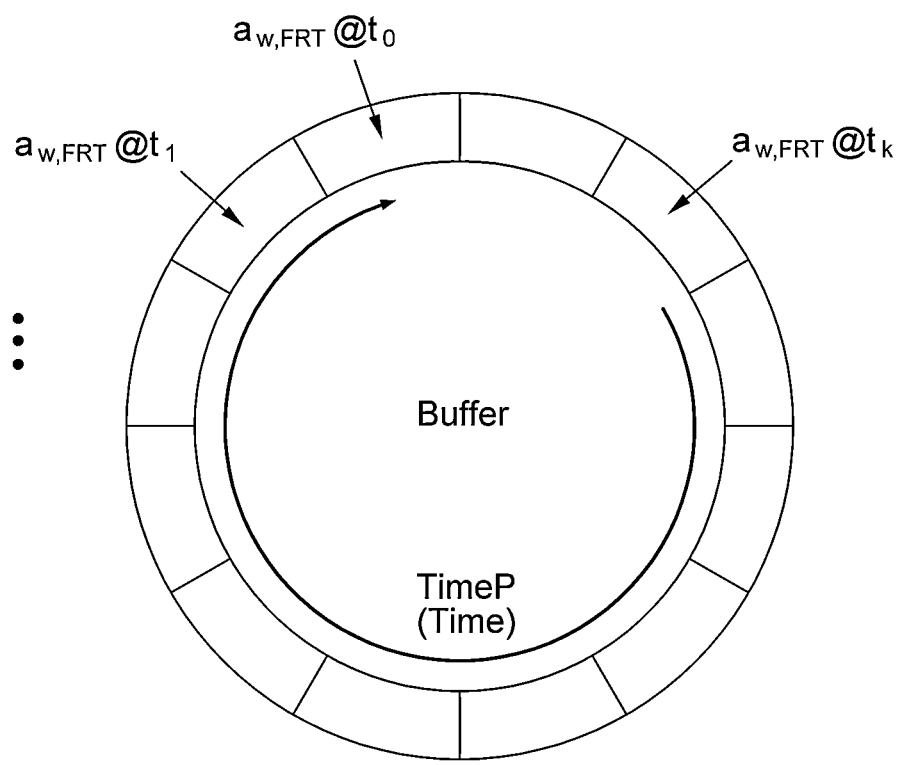
FIG. 1 is a diagram briefly illustrating an embodiment of a method for estimating an acceleration value of a rear wheel in an electronically controlled suspension system in related art.
Figure 2:
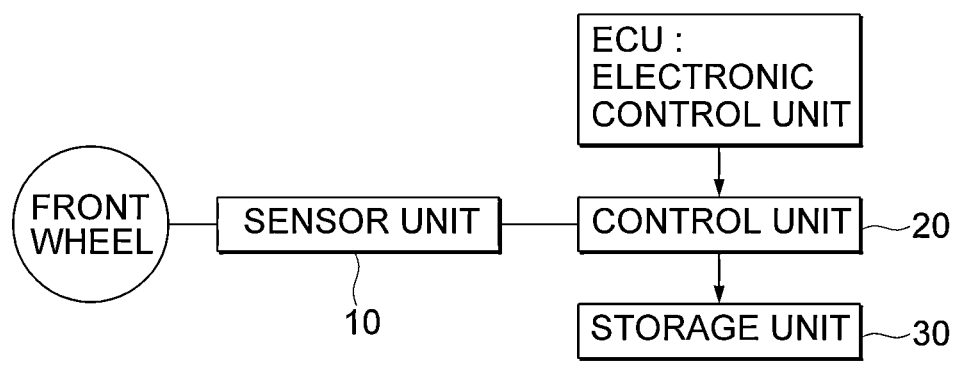
FIG. 2 is a block schematically illustrating an electronically controlled suspension system for estimating a rear wheel acceleration according to an exemplary embodiment of the present disclosure.

FIG. 2 is a block schematically illustrating an electronically controlled suspension system for estimating a rear wheel acceleration according to an exemplary embodiment of the present disclosure.

Referring to FIG. 2, the electronically controlled suspension system for estimating a rear wheel acceleration according to the exemplary embodiment of the present disclosure includes a sensor unit, a storage unit, and a control unit.

The sensor unit 10 is mounted on a front wheel to measure an acceleration value of the front wheel. The sensor unit 10 may be an acceleration sensor.

The acceleration value of the front wheel measured by the sensor unit 10 may be transferred to the control unit 20 which is electrically connected by an electrical signal.

The storage unit 30 may be a kind of memory chip.

The storage unit 30 stores the acceleration value of the front wheel. The control unit 20 may store the acceleration value of the front wheel transferred from the sensor unit 10 in the storage unit 30.

The control unit 20 may be electrically connected to the sensor unit 10 and the storage unit 30, and may store the acceleration value of the front wheel in the storage unit 30 and estimate the acceleration value of the rear wheel by using the acceleration value of the front wheel.

The electronically controlled suspension system for estimating a rear wheel acceleration according to the exemplary embodiment of the present disclosure uses a distance based buffer, considers a situation in which a velocity of the vehicle (hereinafter, referred to as 'vehicle velocity) is changed to compensate the situation, and compensates a difference between the front wheel and the rear wheel by a vehicle specification to increase the acceleration estimation performance of the rear wheel.

In the related art, a time based buffer is used when the electronically controlled suspension system estimates the acceleration value of the rear wheel, but the electronically controlled suspension system for estimating a rear wheel acceleration according to the exemplary embodiment of the present disclosure uses the distance based buffer.

The electronically controlled suspension system for estimating a rear wheel acceleration according to the exemplary embodiment of the present disclosure uses the distance based buffer, stores vehicle velocity information in a vehicle velocity buffer jointly with the acceleration value of the front wheel to compensate an acceleration value (size) of the rear wheel for the vehicle velocity, and reflects a ratio (acceleration constant) of acceleration sizes of the front wheel and the rear wheel for the vehicle specification. Here, the vehicle velocity information, and the acceleration constants of the front wheel and the rear wheel for the vehicle specification may be obtained by a test using an actual vehicle.

Figure 4:
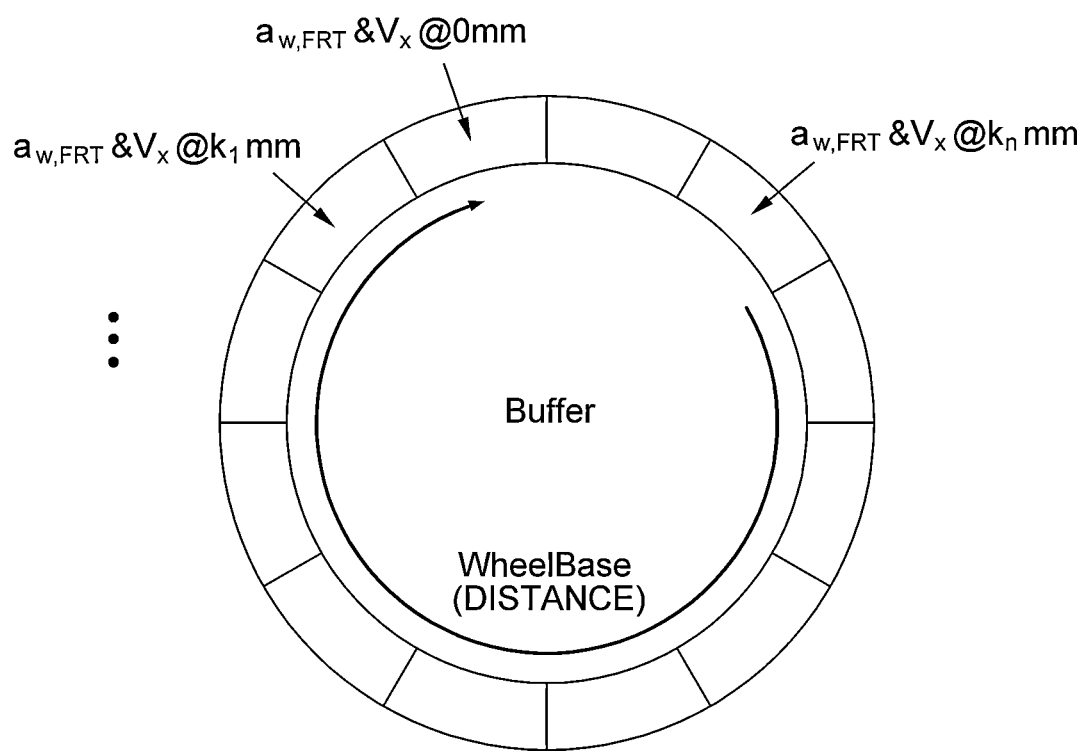
FIG. 4 is a diagram illustrating a description of a distance based buffer in the electronically controlled suspension system for estimating a rear wheel acceleration and the method for estimating a rear wheel acceleration of the electronically controlled suspension system according to an exemplary embodiment of the present disclosure.

FIG. 4 is a diagram illustrating a description of a distance based buffer in the electronically controlled suspension system for estimating a rear wheel acceleration and the method for estimating a rear wheel acceleration of the electronically controlled suspension system according to an exemplary embodiment of the present disclosure.

Referring to FIG. 4, the electronically controlled suspension system for estimating a rear wheel acceleration according to the exemplary embodiment of the present disclosure assumes that the vehicle velocity is not constantly maintained, but changed.

The storage unit 30 includes a buffer, and the buffer includes a front wheel acceleration buffer and a vehicle velocity buffer.

The front wheel acceleration buffer stores a numerical value measured by the acceleration sensor mounted on the front wheel, i.e., the acceleration value of the front wheel, and the vehicle velocity buffer stores a vehicle velocity measured by an electronic control unit (ECU) of the vehicle.

The control unit 20 may store the acceleration value of the front wheel in the front wheel acceleration buffer of the storage unit 30. Further, the control unit 20 may be electrically connected to the electronic control unit (ECU), and may receive the vehicle velocity from the electronic control unit (ECU) and store the received vehicle velocity in the vehicle velocity buffer of the storage unit 30.

The front wheel acceleration buffer and the vehicle velocity buffer use the distance based buffer. The distance based buffer refers to several cells are distinguished by a distance index determined by a user in a buffer described below. A scheme of storing the numerical value by using the distance based buffer is as follows.

The buffer may be constituted by several cells (referred to as 'cell' in the present disclosure), and several cells may be distinguished by the index (referred to as 'index' in the present disclosure) determined by the user. For example, one buffer may be constituted by 10 cells, and each of 10 cells may be distinguished by the index determined by the user. Specifically, when the index determined by the user is a distance index and the distance index is 1 mm, the electronically controlled suspension system may calculate a distance which the vehicle moves and when the vehicle starts from a stop state and moves 1 mm, a numerical value (acceleration value) measured by the acceleration sensor in 1 mm (at a time when the vehicle moves 1 mm) which is the movement distance of the vehicle may be stored in a first cell among 10 cells. In addition, when the vehicle further moves 1 mm, the acceleration value measured by the acceleration sensor at a time when the vehicle further moves 1 mm may be stored in a second cell among 10 cells. In this case, when the vehicle continuously moves and moves 10 mm, the acceleration value measured by the acceleration sensor at a time when the vehicle moves 10 mm may be stored in a tenth cell among 10 cells.

In general, the buffer includes a linear Q type buffer and a circular Q type buffer.

When the linear Q type buffer is described as the above-described example, if the vehicle moves 10 mm, and then further moves 1 mm, and consequently moves 11 mm, the acceleration value measured by the acceleration sensor at a time when the vehicle moves 11 mm may be stored in a tenth cell again. In this case, the existing acceleration values stored in the second cell to the tenth cell are moved from the first cell to the ninth cell, respectively, and stored in an empty tenth cell. If the vehicle further moves 1 mm and moves 12 mm, the acceleration value measured by the acceleration sensor at a time when the vehicle moves 12 mm is stored in the tenth cell.

When the circular Q type buffer is described as the above-described example, if the vehicle moves 10 mm, and then further moves 1 mm, and consequently moves 11 mm, the acceleration value measured by the acceleration sensor at a time when the vehicle moves 11 mm may be stored in the first cell again (in this case, the existing acceleration value stored in the first cell is erased), and if the vehicle further moves 1 mm and consequently moves 12 mm, the acceleration value measured by the acceleration sensor at a time when the vehicle moves 12 mm may be stored in the second cell.

The buffer illustrated in FIG. 4 may represent the circular Q type buffer, and the storage unit 30 (the front wheel acceleration buffer and the vehicle velocity buffer) of the electronically controlled suspension system for estimating a rear wheel acceleration according to the exemplary embodiment of the present disclosure may use the circular Q type buffer.

A front wheel acceleration buffer may be constituted by several cells, and several cells may be distinguished by the index determined by the user. The index determined by the user may be a distance index. Here, the distance index may be k mm. Each of several cells may store the acceleration value of the front wheel corresponding to the distance index. That is, the control unit 20 may store the acceleration value of the front wheel corresponding to the distance index in each of several cells.

The control unit 20 may calculate a traveling distance of the front wheel every control period (time step). The traveling distance of the front wheel may be calculated by [Equation 1] below.

$$x_{k+1} = x_k + v_k T + \tfrac{1}{2} a_k T^2 \qquad \text{[Equation 1]}$$

Here, $x_k$ represents the traveling distance of the front wheel, $x_{k+1}$ represents the traveling distance of the front wheel to which the control period (time step) is applied at one degree, $v_k$ represents the velocity of the vehicle, $a_k$ represents the acceleration of the vehicle, and T represents a time. The control unit 20 may receive the velocity $v_k$ of the vehicle, the acceleration $a_k$ of the vehicle, and the time T from the electronic control unit (ECU).

If the vehicle starts from the stop state and the traveling distance of the front wheel calculated at the control period is k mm (e.g., 10 mm) when the distance index is k mm (e.g., 10 mm), a numerical value (acceleration value) measured by the acceleration sensor of the front wheel at a time when the front wheel moves k mm (e.g., 10 mm) is stored in the first cell among several cells.

A detailed description of a scheme in which the front wheel acceleration buffer adopts the circular Q type buffer, and the control unit 20 stores the acceleration value of the front wheel in the front wheel acceleration buffer, and the acceleration value of the front wheel is stored in the front wheel acceleration buffer is the same as the above-described contents, so the description will be omitted herein.

According to the exemplary embodiment of the present disclosure, when the distance index is k mm (e.g., 10 mm), a case where the traveling distance of the front wheel calculated at the control period (time step) while the vehicle moves is 3*k mm (e.g., 3*10 mm) may occur. For example, a case where the distance index is 10 mm, and the traveling distance of the front wheel calculated at the control period (time step) (e.g. 0.01 second) is 30 mm by exceeding 10 mm may occur. In a case where the velocity or the acceleration of the vehicle increases, the case indicates that a movement distance of the vehicle may increase during the control period (time step) (e.g., 0.01 second). In this case, the control unit 20 may store an acceleration value in a cell corresponding to a middle distance index by performing interpolation. For example, the case is described below.

If the vehicle starts from the stop state and the traveling distance of the front wheel calculated at the control period (0.01 second) is 10 mm when the distance index is 10 mm, a numerical value (acceleration value) measured by the acceleration sensor of the front wheel at a time when the front wheel moves 10 mm is stored in the first cell among several cells. In addition, when the traveling distance of the front wheel calculated at the subsequent control period (time step) (0.01 second) is 30 mm (the front wheel further moves 30 mm and consequently moves a total of 40 mm), the acceleration value measured by the acceleration sensor of the front wheel at a time when the front wheel further moves 30 mm is stored in a fourth cell. In this case, acceleration values to be stored in the second cell and a third cell are calculated by using the interpolation (by using the acceleration values stored in the first cell and the fourth cell), and the calculated acceleration values are filled (stored) in the second cell and the third cell, respectively.

The control unit 20 may estimate the acceleration value of the rear wheel as an acceleration value of the front wheel stored in a cell positioned behind a wheelbase distance from a location of the front wheel. This will be described below in detail.

When the vehicle progresses, since the rear wheel is positioned behind the front wheel, the traveling distance of the rear wheel may be a distance acquired by subtracting the distance corresponding to the wheelbase from the location of the front wheel (the traveling distance of the front wheel). For example, the front wheel acceleration buffer may be constituted by thousands of cells, and thousands of cells may be distinguished by the distance index determined by the user. In this case, when the distance index is 10 mm, and the vehicle starts from the stop state and the total traveling distance of the front wheel calculated every time step is 5000 mm, the acceleration value measured by the acceleration sensor of the front wheel at a time when the traveling distance of the front wheel is 5000 mm may be stored in an n-th cell. In this case, the control unit 20 may estimate the acceleration value of the rear wheel as the acceleration value of the front wheel, which is stored in an n-p-th cell storing the acceleration value of the front wheel at a distance (location) acquired by subtracting the distance which is as large as the wheelbase from the n-th cell storing the acceleration value at a current location of the front wheel. Here, a p-th cell refers to a cell at which a distance index corresponding to the wheelbase is positioned. For example, when the wheelbase is 1940 mm and the distance index is 10 mm, the distance index corresponding to the wheelbase is 194*10 mm, and as a result, the p-th cell refers to a cell positioned behind 194 cells from the n-th cell.

The acceleration value of the rear wheel may be expressed as in [Equation 2] below, and calculated by [Equation 2].

$$a_{w,RR} = a_{w,FRT}\text{Buffer}[k_n - \text{Wheelbase}] \quad \text{[Equation 2]}$$

Here, $a_{w,RR}$ represents the acceleration value of the rear wheel. $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer.

The control unit 20 may compensate the estimated acceleration value (the acceleration value of the front wheel stored in the cell positioned behind the wheelbase distance from the location of the front wheel) of the rear wheel by using the vehicle velocity information.

The vehicle velocity information refers to the velocity of the vehicle stored in the vehicle velocity buffer.

The control unit 20 may store the velocity of the vehicle in the vehicle velocity buffer of the storage unit 30. Specifically, the vehicle velocity may be measured by the electronic control unit (ECU), and the control unit 20 may receive the measured vehicle velocity from the electronic control unit (ECU) and store the received the vehicle velocity in the vehicle velocity buffer.

The vehicle velocity buffer may be constituted by several cells, and several cells may be distinguished by the index determined by the user. The index determined by the user may be the distance index. Here, the distance index may be k mm. Each of several cells may store the vehicle velocity corresponding to the distance index. That is, the control unit 20 may store the vehicle velocity corresponding to the distance index in each of several cells.

For example, one vehicle velocity buffer may be constituted by 10 cells, and each of 10 cells may be distinguished by the distance index determined by the user. Specifically, when the distance index is 1 mm, the electronically controlled suspension system may calculate a distance which the vehicle moves and when the vehicle starts from a stop state and moves 1 mm, a numerical value (vehicle velocity) measured by the electronic control unit (ECU) in 1 mm (at a time when the vehicle moves 1 mm) which is the movement distance of the vehicle may be stored in the first cell among 10 cells. In addition, when the vehicle further moves 1 mm, the vehicle velocity measured by the electronic control unit (ECU) at a time when the vehicle further moves 1 mm may be stored in the second cell among 10 cells. In this case, when the vehicle continuously moves and moves 10 mm, the vehicle velocity measured by the ECU at a time when the vehicle moves 10 mm may be stored in the tenth cell among 10 cells.

A detailed description of a scheme in which the vehicle velocity buffer adopts the circular Q type buffer, the control unit 20 stores the vehicle velocity in the vehicle velocity buffer, and the vehicle velocity is stored in the vehicle velocity buffer is the same as the description in the front wheel acceleration buffer using the distance based buffer, so the description will be omitted herein.

The acceleration values of the front wheel and the rear wheel may be known through the actual vehicle test.

Figure 5:
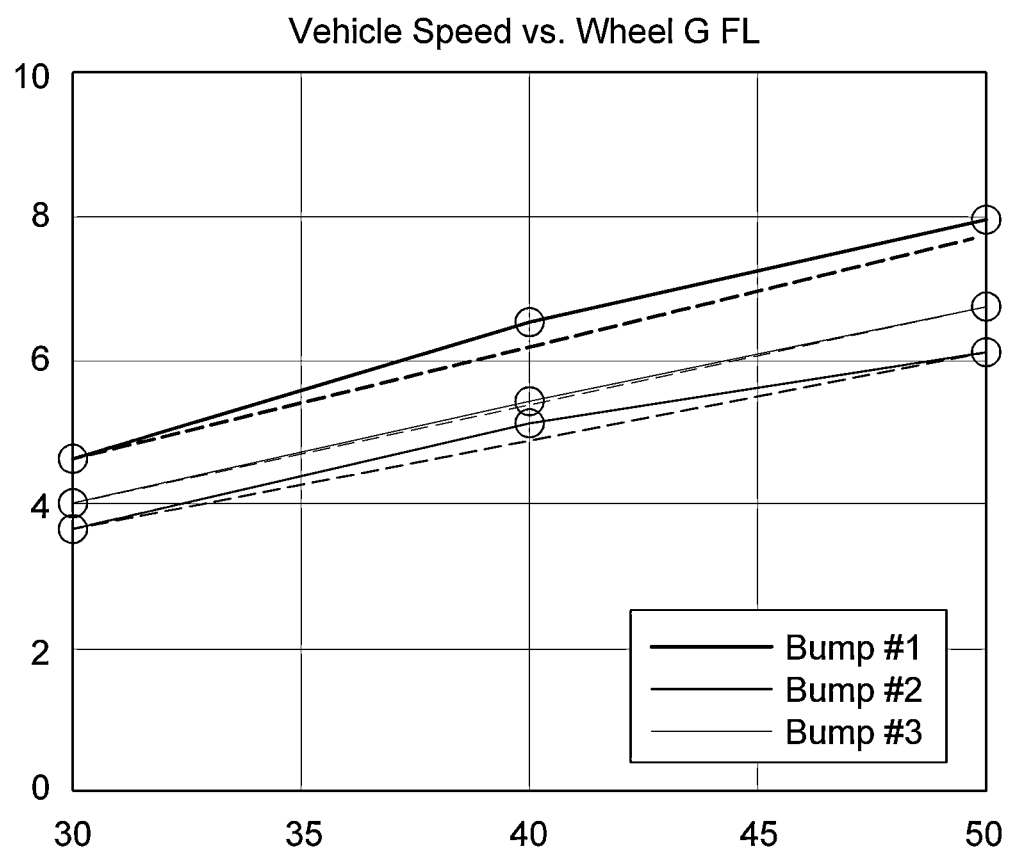
FIG. 5 is a graph illustrating a front wheel acceleration value for a vehicle velocity obtained through an actual vehicle test, and illustrates an acceleration value for a vehicle velocity measured in a left front wheel.
Figure 6:
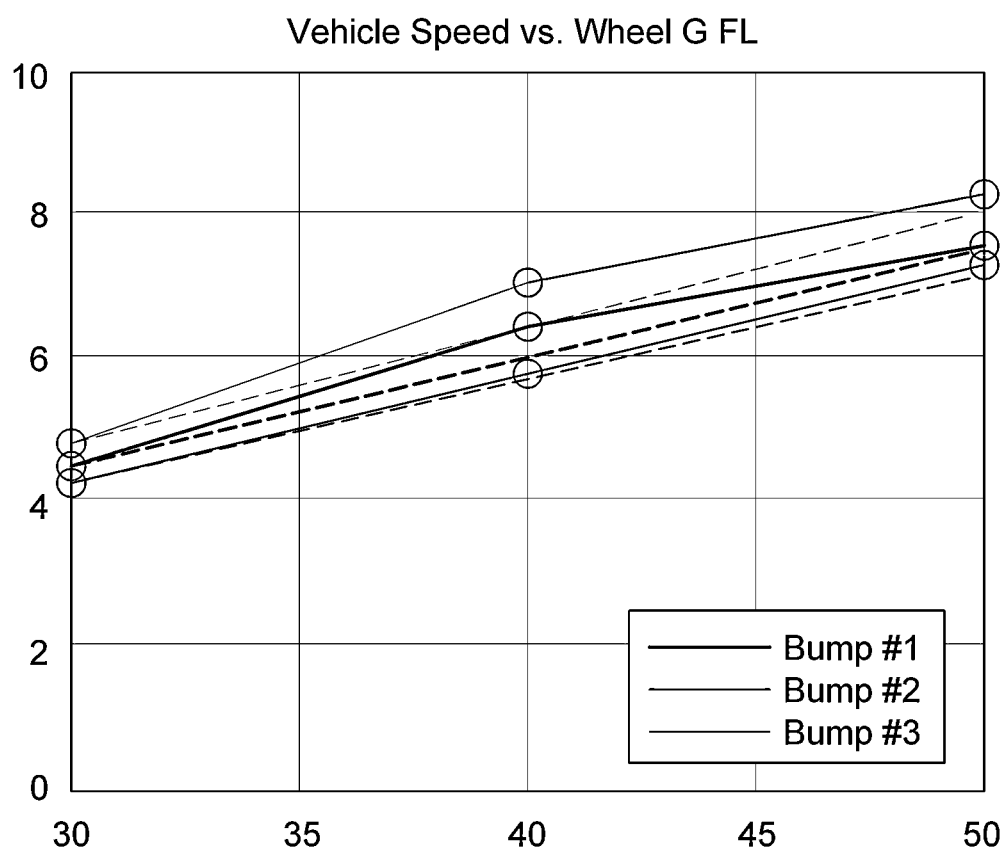
FIG. 6 is a graph illustrating the front wheel acceleration value for the vehicle velocity obtained through the actual vehicle test, and illustrates an acceleration value for a vehicle velocity measured in a right front wheel.

FIG. 5 is a graph illustrating a front wheel acceleration value (vertical axis) for a vehicle velocity (horizontal axis) obtained through an actual vehicle test, and illustrates an acceleration value for a vehicle velocity measured in a left front wheel and FIG. 6 is a graph illustrating the front wheel acceleration value (vertical axis) for the vehicle velocity (horizontal axis) obtained through the actual vehicle test, and illustrates an acceleration value for a vehicle velocity measured in a right front wheel.

Figure 7:
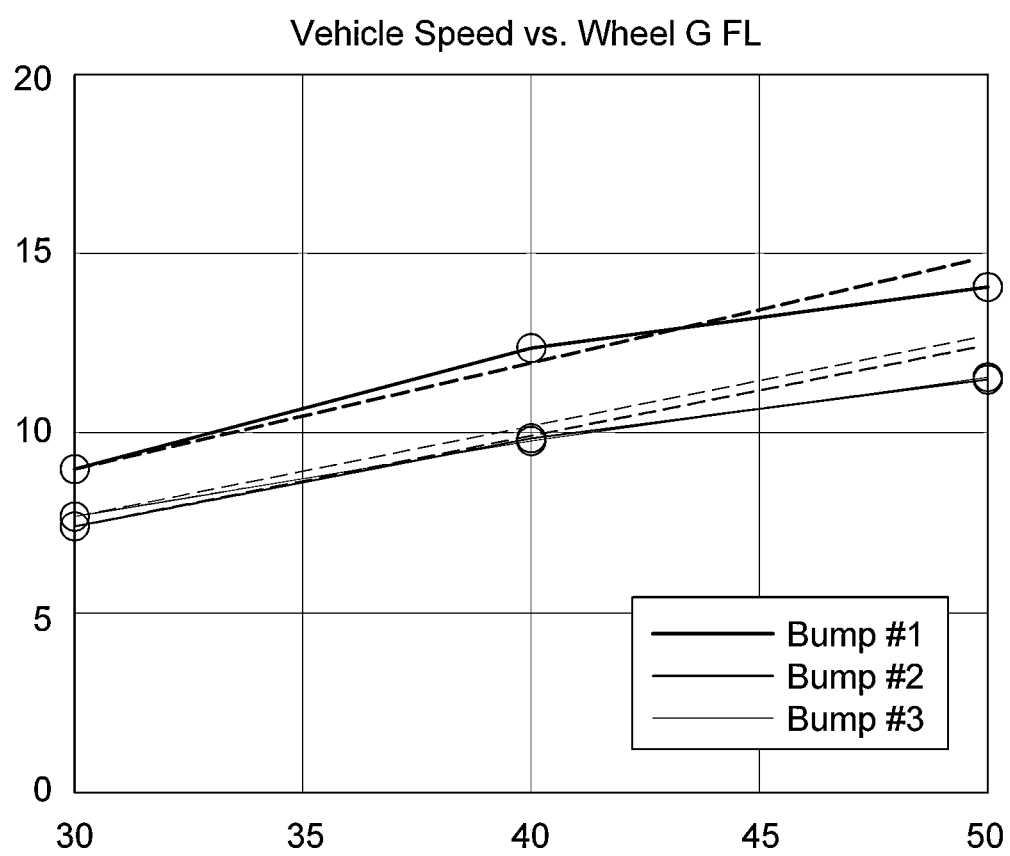
FIG. 7 is a graph illustrating a rear wheel acceleration value for the vehicle velocity obtained through the actual vehicle test, and illustrates an acceleration value for a vehicle velocity measured in a left rear wheel.
Figure 8:
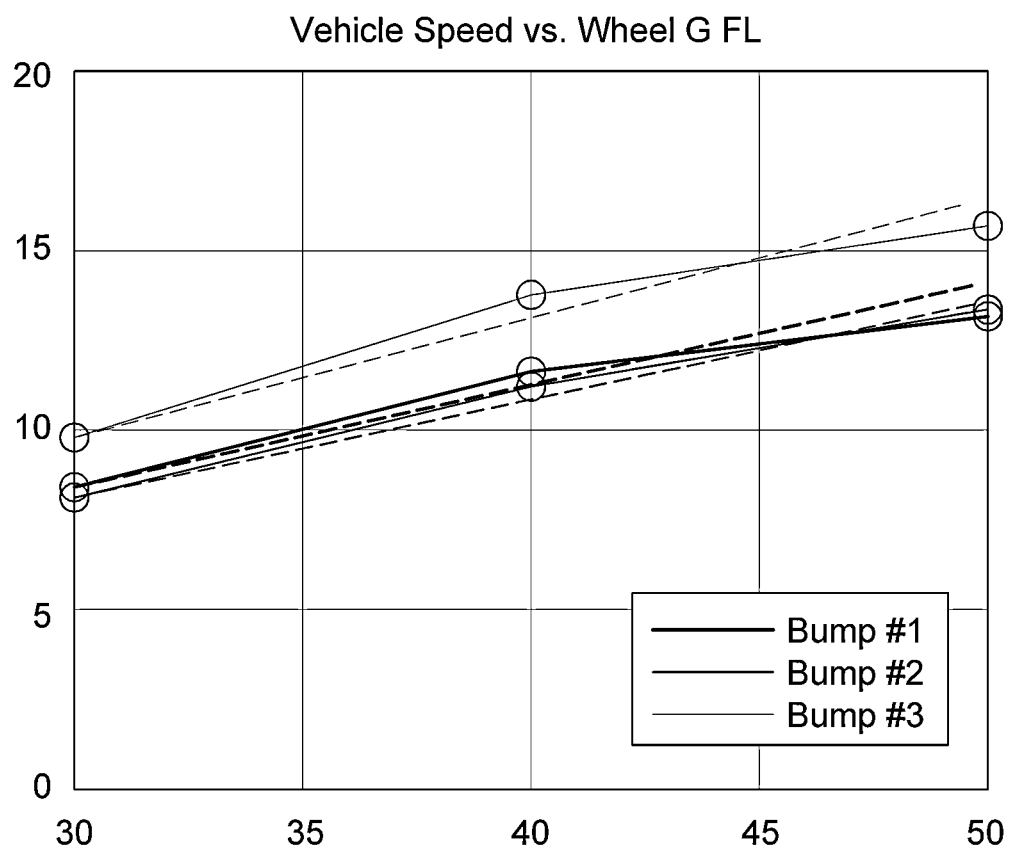
FIG. 8 is a graph illustrating the rear wheel acceleration value for the vehicle velocity obtained through the actual vehicle test, and illustrates an acceleration value for a vehicle velocity measured in a right rear wheel.

FIG. 7 is a graph illustrating a rear wheel acceleration value (vertical axis) for the vehicle velocity (horizontal axis) obtained through the actual vehicle test, and illustrates an acceleration value for a vehicle velocity measured in a left rear wheel and FIG. 8 is a graph illustrating the rear wheel acceleration value (vertical axis) for the vehicle velocity (horizontal axis) obtained through the actual vehicle test, and illustrates an acceleration value for a vehicle velocity measured in a right rear wheel.

In FIGS. 5 to 8, Bumps #1, #2, and #3 represent the number of actual vehicle test times, and a dotted line represents an ideal value and a solid line represents a measurement value.

Referring to FIGS. 5 to 8, it may be known that the acceleration values of the front wheel and the rear wheel are in proportion to the vehicle velocity.

Accordingly, the acceleration value of the rear wheel compensated by the vehicle velocity information may represent an equation which is in proportion to the vehicle velocity, and may be expressed as in [Equation 3] below and calculated by [Equation 3]. [Equation 3] is equal to a value acquired by multiplying [Equation 2] described above by a vehicle velocity information value (a vehicle velocity value which is in proportion to the vehicle velocity information value).

$$a_{w,RR} = a_{w,FRT}\text{Buffer}[k_n-\text{Wheelbase}] * \{v_x\text{Buffer}[k_n]/ (v_x\text{Buffer}[k_n-\text{Wheelbase}])\} \qquad \text{[Equation 3]}$$

Here, $a_{w,RR}$ represents the acceleration value of the rear wheel. $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer (is as in [Equation 2] described above). $v_x\text{Buffer}[k_n]$ represents the vehicle velocity of the front wheel, which is stored in the $k_n$-th cell storing the vehicle velocity at the current location of the front wheel in the vehicle velocity buffer. $(v_x\text{Buffer}[k_n-\text{Wheelbase}])$ represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer.

Accordingly, the electronically controlled suspension system for estimating a rear wheel acceleration according to the exemplary embodiment of the present disclosure may have the acceleration estimation performance of the rear wheel with high accuracy by considering information on the vehicle velocity changed and using the information on the vehicle velocity for compensating the size of the rear wheel acceleration value.

The control unit 20 may compensate the acceleration value of the rear wheel compensated by the vehicle velocity information by using the specification of the vehicle regardless of the vehicle velocity.

The acceleration constants of the front wheel and the rear wheel may be known through the actual vehicle test.

Figure 9:
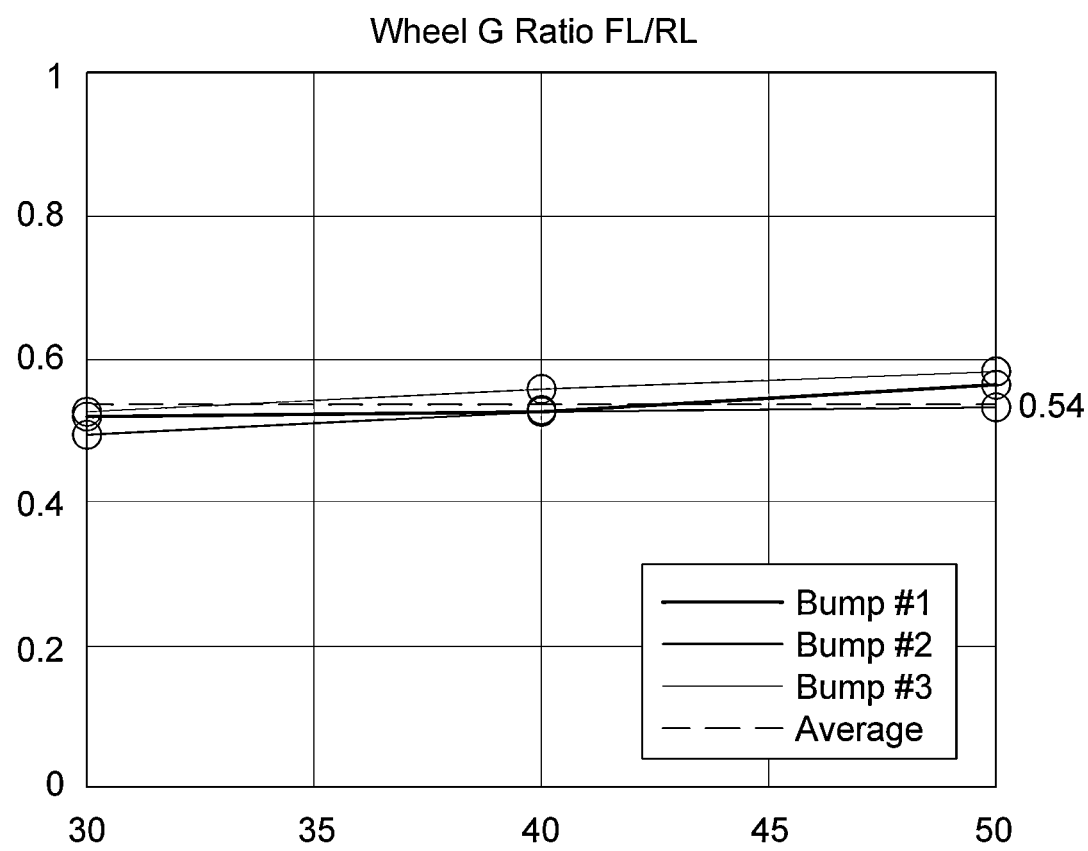
FIG. 9 is a graph illustrating acceleration constants of a front wheel and a rear wheel obtained through the actual vehicle test, and illustrates an acceleration size ratio (acceleration constant) of the left rear wheel for the left front wheel.
Figure 10:
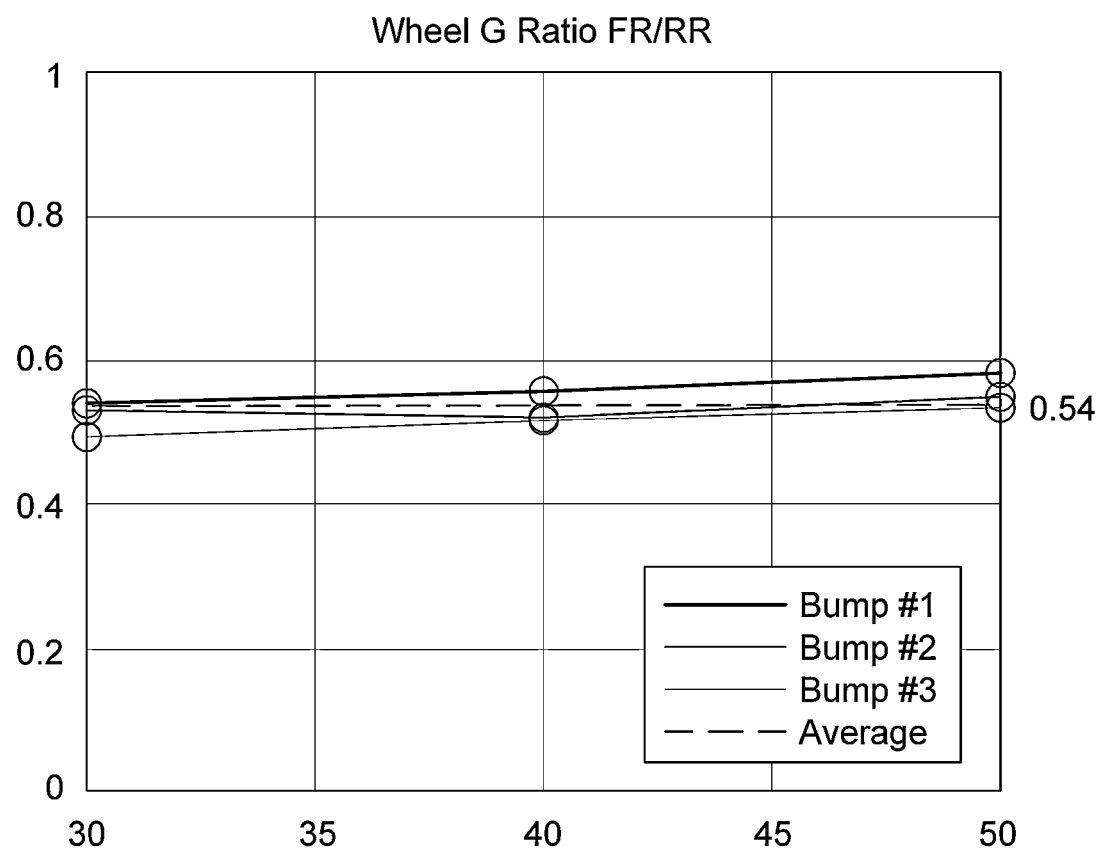
FIG. 10 is a graph illustrating the acceleration constants of the front wheel and the rear wheel obtained through the actual vehicle test, and illustrates an acceleration size ratio (acceleration constant) of a right rear wheel for a right front wheel.

FIG. 9 is a graph illustrating acceleration constants of a front wheel and a rear wheel (vertical axis) for vehicle velocity (horizontal axis) obtained through the actual vehicle test, and illustrates an acceleration size ratio (acceleration constant) of the left front wheel to the left rear wheel and FIG. 10 is a graph illustrating the acceleration constants of the front wheel and the rear wheel (vertical axis) for vehicle velocity (horizontal axis) obtained through the actual vehicle test, and illustrates an acceleration size ratio (acceleration constant) of a right front wheel to a right rear wheel.

In FIGS. 9 to 10, Bumps #1, #2, and #3 represent the number of actual vehicle test times, and the dotted line represents an average value and the solid line represents the measurement value.

Referring to FIGS. 9 and 10, it may be known that an acceleration size ratio of the front wheel to the rear wheel at both left and right sides are constant regardless of the vehicle velocity. Further, it may be known that an acceleration size ratio of a left front wheel to a left rear wheel and an acceleration size ratio of a right rear wheel to a right front wheel are the same.

Accordingly, since it is characterized in that the acceleration size ratios of the front wheel and the rear wheel according to the vehicle specification are similar to each other regardless of the vehicle velocity, this may be assumed as a constant (referred to as 'acceleration constant' in the present disclosure).

Accordingly, the acceleration value of the rear wheel compensated by the acceleration size ratio (acceleration constant) of the front wheel and the rear wheel may represent an equation which is in proportion to the acceleration size ratio (acceleration constant) of the front wheel and the rear wheel, and may be expressed as in [Equation 4] below and calculated by [Equation 4]. [Equation 4] is equal to a value acquired by multiplying [Equation 3] described above by the acceleration size ratio of the front wheel and the rear wheel.

$$a_{w,RR} = a_{w,FRT}\text{Buffer}[k_n-\text{Wheelbase}] * \{v_x\text{Buffer}[k_n]/ (v_x\text{Buffer}[k_n-\text{Wheelbase}])\} * \text{WheelGRatio} \qquad \text{[Equation 4]}$$

Here, $a_{w,RR}$ represents the acceleration value of the rear wheel. $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer (is as in [Equation 2] described above). $v_x\text{Buffer}[k_n]$ represents the vehicle velocity of the front wheel, which is stored in the $k_n$-th cell storing the vehicle velocity at the current location of the front wheel in the vehicle velocity buffer. $(v_x\text{Buffer}[k_n-\text{Wheelbase}])$ represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer. WheelGRatio represents the acceleration size ratio (acceleration constant).

In [Equation 4], $a_{w,RR}$ represents the acceleration value of the rear wheel compensated by the vehicle specification, which is acquired by compensating the acceleration value of the rear wheel compensated by the vehicle velocity information by using the vehicle specification.

Accordingly, the acceleration value $(a_{w,RR})$ of the rear wheel compensated by the vehicle specification, which is expressed by [Equation 4] is the acceleration value of the rear wheel, which is finally acquired by the electronically controlled suspension system for estimating a rear wheel acceleration according to the exemplary embodiment of the present disclosure. That is, $a_{w,RR}$ represents the acceleration value of the rear wheel, which is finally estimated according to the present disclosure.

The control unit 20 may estimate the acceleration value of the rear wheel by using [Equation 4] which is finally acquired. The acquired acceleration value of the rear wheel may be stored in the storage unit 30.

Hereinafter, the method for estimating a rear wheel acceleration of the electronically controlled suspension system according to the exemplary embodiment of the present disclosure will be described.

Figure 3:
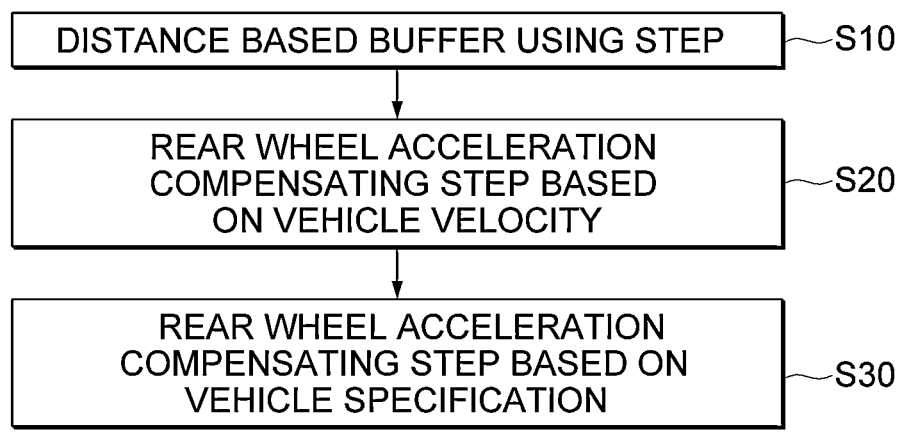
FIG. 3 is a flowchart illustrating a method for estimating a rear wheel acceleration of the electronically controlled suspension system according to an exemplary embodiment of the present disclosure.

FIG. 3 is a flowchart illustrating a method for estimating a rear wheel acceleration of the electronically controlled suspension system according to an exemplary embodiment of the present disclosure.

Referring to FIG. 3, the method for estimating a rear wheel acceleration of the electronically controlled suspension system according to the exemplary embodiment of the present disclosure uses a distance based buffer, considers a situation in which a velocity of the vehicle (hereinafter, referred to as 'vehicle velocity) is changed to compensate the situation, and compensates a difference between the front wheel and the rear wheel by a vehicle specification to increase the acceleration estimation performance of the rear wheel.

In the related art, a time based buffer is used when the electronically controlled suspension system estimates the acceleration value of the rear wheel, but the method for estimating a rear wheel acceleration of the electronically controlled suspension system according to the exemplary embodiment of the present disclosure uses the distance based buffer.

The method for estimating a rear wheel acceleration of the electronically controlled suspension system according to the exemplary embodiment of the present disclosure uses the distance based buffer, stores vehicle velocity information in a vehicle velocity buffer jointly with the acceleration value of the front wheel to compensate an acceleration value (size) of the rear wheel for the vehicle velocity, and reflects a ratio (acceleration constant) of acceleration sizes of the front wheel and the rear wheel for the vehicle specification. Here, the vehicle velocity information, and the acceleration constants of the front wheel and the rear wheel for the vehicle specification may be obtained by a test using an actual vehicle.

Accordingly, the method for estimating a rear wheel acceleration of the electronically controlled suspension system according to the exemplary embodiment of the present disclosure includes, a distance based buffer using step (S10), a rear wheel acceleration compensating step based on the vehicle velocity (S20), and a rear wheel acceleration compensating step based on the vehicle specification (S30). Hereinafter, respective steps will be described.

Referring back to FIG. 4, the method for estimating a rear wheel acceleration of the electronically controlled suspension system according to the exemplary embodiment of the present disclosure assumes that the vehicle velocity is not constantly maintained, but changed. In addition, the buffer includes each of a front wheel acceleration buffer storing a numerical value measured by the acceleration sensor mounted on the front wheel, i.e., the acceleration value of the front wheel, and a vehicle velocity buffer storing a vehicle velocity measured by an electronic control unit (ECU) of the vehicle. The front wheel acceleration buffer and the vehicle velocity buffer use the distance based buffer. The distance based buffer refers to several cells being distinguished by a distance index determined by a user in a buffer described below.

The buffer may be constituted by several cells (referred to as 'cell' in the present disclosure), and several cells may be distinguished by the index (referred to as 'index' in the present disclosure) determined by the user. For example, one buffer may be constituted by 10 cells, and each of 10 cells may be distinguished by the index determined by the user. Specifically, when the index determined by the user is a distance index and the distance index is 1 mm, the electronically controlled suspension system may calculate a distance which the vehicle moves and when the vehicle starts from a stop state and moves 1 mm, a numerical value (acceleration value) measured by the acceleration sensor in 1 mm (at a time when the vehicle moves 1 mm) which is the movement distance of the vehicle may be stored in a first cell among 10 cells. In addition, when the vehicle further moves 1 mm the acceleration value measured by the acceleration sensor at a time when the vehicle further moves 1 mm may be stored in a second cell among 10 cells. In this case, when the vehicle continuously moves and moves 10 mm, the acceleration value measured by the acceleration sensor at a time when the vehicle moves 10 mm may be stored in a tenth cell among 10 cells.

In general, the buffer includes a linear Q type buffer and a circular Q type buffer.

When the linear Q type buffer is described as the above-described example, if the vehicle moves 10 mm, and then further moves 1 mm, and consequently moves 11 mm, the acceleration value measured by the acceleration sensor at a time when the vehicle moves 11 mm may be stored in a tenth cell again. In this case, the existing acceleration values stored in the second cell to the tenth cell are moved from the first cell to the ninth cell, respectively, and stored in an empty tenth cell. If the vehicle further moves 1 mm and moves 12 mm, the acceleration value measured by the acceleration sensor at a time when the vehicle moves 12 mm is stored in the tenth cell.

When the circular Q type buffer is described as the above-described example, if the vehicle moves 10 mm, and then further moves 1 mm, and consequently moves 11 mm, the acceleration value measured by the acceleration sensor at a time when the vehicle moves 11 mm may be stored in the first cell again (in this case, the existing acceleration value stored in the first cell is erased), and if the vehicle further moves 1 mm and consequently moves 12 mm, the acceleration value measured by the acceleration sensor at a time when the vehicle moves 12 mm may be stored in the second cell.

The buffer illustrated in FIG. 4 may represent the circular Q type buffer, and in the method for estimating a rear wheel acceleration of the electronically controlled suspension system according to the exemplary embodiment of the present disclosure, the front wheel acceleration buffer and the vehicle velocity buffer may adopt the circular Q type buffer.

The method for estimating a rear wheel acceleration of the electronically controlled suspension system according to the exemplary embodiment of the present disclosure includes the distance based buffer using step (S10).

The distance based buffer using step (S10) includes the front wheel acceleration buffer and the vehicle velocity buffer, and the front wheel acceleration buffer and the vehicle velocity buffer adopt the distance based buffer.

In the distance based buffer using step (S10), the front wheel acceleration buffer and the vehicle velocity buffer adopt the distance based buffer. The distance based buffer refers to several cells being distinguished by a distance index determined by the user in the buffer.

A front wheel acceleration buffer may be constituted by several cells, and several cells may be distinguished by the index determined by the user. The index determined by the user may be the distance index. Here, the distance index may be k mm. Each of several cells may store the acceleration value of the front wheel corresponding to the distance index.

In the distance based buffer using step (S10), the electronically controlled suspension system may calculate the traveling distance of the front wheel every control period (time step). The traveling distance of the front wheel may be calculated by [Equation 5] below.

$$x_{k+1} = x_k + v_k T + \tfrac{1}{2} a_k T^2 \qquad \text{[Equation 5]}$$

Here, $x_k$ represents the traveling distance of the front wheel, $x_{k+1}$ represents the traveling distance of the front wheel to which the control period (time step) is applied at one degree, $v_k$ represents the velocity of the vehicle, $a_k$ represents the acceleration of the vehicle, and T represents a time.

If the vehicle starts from the stop state and the traveling distance of the front wheel calculated at the control period is k mm (e.g., 10 mm) when the distance index is k mm (e.g., 10 mm), a numerical value (acceleration value) measured by the acceleration sensor of the front wheel at a time when the front wheel moves k mm (e.g., 10 mm) is stored in the first cell among several cells.

A detailed description of a scheme in which the front wheel acceleration buffer adopts the circular Q type buffer and the acceleration value is stored in the buffer, and the acceleration value of the front wheel is stored in the front wheel acceleration buffer is the same as the above-described contents, so the description will be omitted herein.

According to the exemplary embodiment of the present disclosure, when the distance index is k mm (e.g., 10 mm), a case where the traveling distance of the front wheel calculated at the control period (time step) while the vehicle moves is 3*k mm (e.g., 3*10 mm) may occur. For example, a case where the distance index is 10 mm, and the traveling distance of the front wheel calculated at the time step (e.g. 0.01 second) is 30 mm by exceeding 10 mm may occur. In a case where the velocity or the acceleration of the vehicle increases, the case indicates that a movement distance of the vehicle may increase during the time step (e.g., 0.01 second). In this case, the method for estimating a rear wheel acceleration of the electronically controlled suspension system according to the present disclosure may store an acceleration value in a cell corresponding to a middle distance index by performing interpolation. For example, the case is described below.

If the vehicle starts from the stop state and the traveling distance of the front wheel calculated at the control period (0.01 second) is 10 mm when the distance index is 10 mm, a numerical value (acceleration value) measured by the acceleration sensor of the front wheel at a time when the front wheel moves 10 mm is stored in the first cell among several cells. In addition, when the traveling distance of the front wheel calculated at the subsequent time step (0.01 second) is 30 mm (the front wheel further moves 30 mm and consequently moves a total of 40 mm), the acceleration value measured by the acceleration sensor of the front wheel at a time when the front wheel further moves 30 mm is stored in a fourth cell. In this case, acceleration values to be stored in the second cell and a third cell are calculated by using the interpolation (by using the acceleration values stored in the first cell and the fourth cell), and the calculated acceleration values are filled (stored) in the second cell and the third cell, respectively.

By the method for estimating a rear wheel acceleration of the electronically controlled suspension system according to the exemplary embodiment of the present disclosure, the acceleration value of the rear wheel may be estimated as the acceleration value of the front wheel, which is stored in a cell positioned behind the location of the front wheel by the wheelbase distance. This will be described below in detail.

When the vehicle progresses, since the rear wheel is positioned behind the front wheel, the traveling distance of the rear wheel may be a distance acquired by subtracting the distance corresponding to the wheelbase from the location of the front wheel (the traveling distance of the front wheel). For example, the front wheel acceleration buffer may be constituted by thousands of cells, and thousands of cells may be distinguished by the distance index determined by the user. In this case, when the distance index is 10 mm, and the vehicle starts from the stop state and the total traveling distance of the front wheel calculated every time step is 5000 mm, the acceleration value measured by the acceleration sensor of the front wheel at a time when the traveling distance of the front wheel is 5000 mm may be stored in an n-th cell. In this case, the acceleration value of the rear wheel may be estimated as the acceleration value of the front wheel, which is stored in an n-p-th cell storing the acceleration value of the front wheel at a distance (location) acquired by subtracting the distance which is as large as the wheelbase from the n-th cell storing the acceleration value at a current location of the front wheel. Here, a p-th cell refers to a cell at which a distance index corresponding to the wheelbase is positioned. For example, when the wheelbase is 1940 mm and the distance index is 10 mm, the distance index corresponding to the wheelbase is 194*10 mm, and as a result, the p-th cell refers to a cell positioned behind 194 cells from the n-th cell.

The acceleration value of the rear wheel may be expressed as in [Equation 6] below, and calculated by [Equation 6].

$$a_{w,RR} = a_{w,FRT}\text{Buffer}[k_n - \text{Wheelbase}] \quad \text{[Equation 6]}$$

Here, $a_{w,RR}$ represents the acceleration value of the rear wheel in the step (S10) of using the distance based buffer. $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer.

The method for estimating a rear wheel acceleration of the electronically controlled suspension system according to the exemplary embodiment of the present disclosure includes the rear wheel acceleration compensating step based on the vehicle velocity (S20).

In the rear wheel acceleration compensating step based on the vehicle velocity (S20), the acceleration value of the rear wheel, which is estimated in the step (S10) of using the distance based buffer by using the vehicle velocity information may be compensated.

The vehicle velocity information refers to the velocity of the vehicle stored in the vehicle velocity buffer.

The vehicle velocity may be measured by the electronic control unit (ECU) of the vehicle and the measured vehicle velocity may be stored in the vehicle velocity buffer.

The vehicle velocity buffer may be constituted by several cells, and several cells may be distinguished by the index determined by the user. The index determined by the user may be the distance index. Here, the distance index may be k mm. Each of several cells may store the vehicle velocity corresponding to the distance index.

For example, one vehicle velocity buffer may be constituted by 10 cells, and each of 10 cells may be distinguished by the distance index determined by the user. Specifically, when the distance index is 1 mm, the electronically controlled suspension system may calculate a distance which the vehicle moves and when the vehicle starts from a stop state and moves 1 mm, a numerical value (vehicle velocity) measured by the electronic control unit (ECU) in 1 mm (at a time when the vehicle moves 1 mm) which is the movement distance of the vehicle may be stored in the first cell among 10 cells. In addition, when the vehicle further moves 1 mm, the vehicle velocity measured by the electronic control unit (ECU) at a time when the vehicle further moves 1 mm may be stored in the second cell among 10 cells. In this case, when the vehicle continuously moves and moves 10 mm, the vehicle velocity measured by the ECU at a time when the vehicle moves 10 mm may be stored in the tenth cell among 10 cells.

In the method for estimating a rear wheel acceleration of the electronically controlled suspension system according to the exemplary embodiment of the present disclosure, the vehicle velocity buffer may adopt the circular Q type buffer. A detailed description thereof is the same as the description in the front wheel acceleration buffer using the distance based buffer, so the description will be omitted herein.

The acceleration values of the front wheel and the rear wheel may be known through the actual vehicle test.

Referring back to FIGS. 5 to 8, it may be known that the acceleration values of the front wheel and the rear wheel are in proportion to the vehicle velocity.

Accordingly, in the rear wheel acceleration compensating step based on the vehicle velocity (S20), the acceleration value of the rear wheel compensated by the vehicle velocity information may represent an equation which is in proportion to the vehicle velocity, and may be expressed as in [Equation 7] below and calculated by [Equation 7]. [Equation 7] is equal to a value acquired by multiplying [Equation 6] described above by a vehicle velocity information value (a vehicle velocity value which is in proportion to the vehicle velocity information value).

$$a_{w,RR}=a_{w,FRT}\text{Buffer}[k_n-\text{Wheelbase}]*\{v_x\text{Buffer}[k_n]/(v_x\text{Buffer}[k_n-\text{Wheelbase}])\} \quad \text{[Equation 7]}$$

Here, $a_{w,RR}$ represents the acceleration value of the rear wheel acquired in the rear wheel acceleration compensating step based on the vehicle velocity (S20). $a_{w,FRT}\text{Buffer}[k_n-\text{Wheelbase}]$ represents the acceleration value of the rear wheel acquired in the step (S10) of using the distance based buffer (as in [Equation 6] described below). $v_x\text{Buffer}[k_n]$ represents the vehicle velocity of the front wheel, which is stored in the $k_n$-th cell storing the vehicle velocity at the current location of the front wheel in the vehicle velocity buffer. ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer.

Accordingly, the method for estimating a rear wheel acceleration of the electronically controlled suspension system according to the exemplary embodiment of the present disclosure may have the acceleration estimation performance of the rear wheel with high accuracy by considering information on the vehicle velocity changed and using the information on the vehicle velocity for compensating the size of the rear wheel acceleration value.

The method for estimating a rear wheel acceleration of the electronically controlled suspension system according to the exemplary embodiment of the present disclosure includes the rear wheel acceleration compensating step based on the vehicle specification (S30).

In the rear wheel acceleration compensating step based on the vehicle specification (S30), the acceleration value of the rear wheel compensated by the vehicle velocity information in the rear wheel acceleration compensating step based on the vehicle velocity (S20) may be compensated by using the specification of the vehicle regardless of the vehicle velocity.

The acceleration constants of the front wheel and the rear wheel may be known through the actual vehicle test.

Referring back to FIGS. 9 and 10, it may be known that an acceleration size ratio of the rear wheel to the front wheel at both left and right sides are constant regardless of the vehicle velocity. Further, it may be known that an acceleration size ratio of a left rear wheel to a left front wheel and an acceleration size ratio of a right rear wheel to a right front wheel are the same.

Accordingly, since it is characterized in that the acceleration size ratios of the front wheel and the rear wheel according to the vehicle specification are similar to each other regardless of the vehicle velocity, this may be assumed as a constant (referred to as 'acceleration constant' in the present disclosure).

Accordingly, in the rear wheel acceleration compensating step based on the vehicle specification (S30), the acceleration value of the rear wheel compensated by the acceleration size ratio (acceleration constant) of the front wheel and the rear wheel may represent an equation which is in proportion to the acceleration size ratio (acceleration constant) of the front wheel and the rear wheel, and may be expressed as in [Equation 8] below and calculated by [Equation 8]. [Equation 8] is equal to a value acquired by multiplying [Equation 7] described above by the acceleration size ratio of the front wheel and the rear wheel.

$$a_{w,RR}=a_{w,FRT}\text{Buffer}[k_n-\text{Wheelbase}]*\{v_x\text{Buffer}[k_n]/(v_x\text{Buffer}[k_n-\text{Wheelbase}])\}*\text{WheelGRatio} \quad \text{[Equation 8]}$$

Here, $a_{w,RR}$ represents the acceleration value of the rear wheel acquired in the rear wheel acceleration compensating step based on the vehicle specification (S30). $a_{w,FRT}\text{Buffer}[k_n-\text{Wheelbase}]$ represents the acceleration value of the rear wheel acquired in the step (S10) of using the distance based buffer (as in [Equation 6] described below). $v_x\text{Buffer}[k_n]$ represents the vehicle velocity of the front wheel, which is stored in the $k_n$— th cell storing the vehicle velocity at the current location of the front wheel in the vehicle velocity buffer. ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer. WheelGRatio represents the acceleration size ratio (acceleration constant).

In [Equation 8], $a_{wAR}$ represents the acceleration value of the rear wheel acquired in the rear wheel acceleration compensating step based on the vehicle specification (S30).

Accordingly, the acceleration value ($a_{w,RR}$) of the rear wheel acquired in the rear wheel acceleration compensating step based on the vehicle specification (S30), which is expressed by [Equation 8] is the acceleration value of the rear wheel, which is finally acquired by the method for estimating a rear wheel acceleration of the electronically controlled suspension system according to the exemplary embodiment of the present disclosure. That is, $a_{w,RR}$ represents the acceleration value of the rear wheel, which is finally estimated according to the present disclosure.

Accordingly, the electronically controlled suspension system for estimating a rear wheel acceleration and the method for estimating a rear wheel acceleration of the electronically controlled suspension system according to the exemplary embodiments of the present disclosure may have the acceleration estimation performance of the rear wheel with high accuracy by considering information on the vehicle velocity changed and using the information on the vehicle velocity for compensating the size of the rear wheel acceleration value.

The electronically controlled suspension system for estimating a rear wheel acceleration and the method for estimating a rear wheel acceleration of the electronically controlled suspension system according to the exemplary embodiments of the present disclosure use the distance based buffer, stores vehicle velocity information in the buffer jointly with the acceleration value of the front wheel to compensate an acceleration value (size) of the rear wheel for the vehicle velocity, and uses a ratio (acceleration constant) of acceleration sizes of the front wheel and the rear wheel for the vehicle specification for compensating the acceleration value (size) of the rear wheel to achieve rear wheel acceleration estimation performance with higher accuracy.

As a result, the electronically controlled suspension system for estimating a rear wheel acceleration and the method for estimating a rear wheel acceleration of the electronically controlled suspension system according to the exemplary embodiments of the present disclosure may enhance a ride comfort and a stability of the vehicle.

Features, structures, effects, and the like described in the above exemplary embodiments are included in at least one exemplary embodiment of the present disclosure, and are not particularly limited to only one exemplary embodiment. Furthermore, features, structures, effects, and the like exemplified in each exemplary embodiment may be combined or modified for other exemplary embodiments those skilled in the art to which the exemplary embodiments pertain. Therefore, the contents related to such combinations and modifications should be interpreted as being included in the scope of the present disclosure.

Although the exemplary embodiments have been mainly described above, these are merely examples and do not limit the present disclosure, and those skilled in the art to which the present disclosure pertains will know that various modifications and applications not illustrated above can be made within the scope without departing from the essential characteristics of the embodiment. That is, each component specifically shown in the exemplary embodiment can be implemented by being modified. In addition, it will be interpreted that differences related to the modifications and applications are included in the scope of the present disclosure defined in the appended claims.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An electronically controlled suspension system for estimating a rear wheel acceleration, comprising:
   a sensor unit measuring an acceleration value of a front wheel;
   a storage unit storing the acceleration value of the front wheel; and
   a control unit electrically connected to the sensor unit and the storage unit, and storing the acceleration value of the front wheel in the storage unit, and estimating the acceleration value of a rear wheel by using the acceleration value of the front wheel,
   wherein the storage unit has a front wheel acceleration buffer, the front wheel acceleration buffer is constituted by several cells, and the several cells are distinguished by a distance index, and
   wherein the control unit stores the acceleration value of the front wheel corresponding to the distance index in each of the several cells, and the acceleration value of the rear wheel is estimated as the acceleration value of the front wheel, which is stored in a cell positioned behind a location of the front wheel by a wheelbase distance.

2. The electronically controlled suspension system of claim 1, wherein the control unit estimating the acceleration value of the front wheel, which is stored in the cell positioned behind the location of the front wheel by the wheelbase distance as the acceleration value of the rear wheel is estimating the acceleration value of the front wheel, which is stored in a cell storing the acceleration value at a location acquired by subtracting a distance which is as large as a wheelbase from the cell storing the acceleration value at the current location of the front wheel as the acceleration value of the rear wheel.

3. The electronically controlled suspension system of claim 1, wherein in a case where the velocity or the acceleration of the vehicle increases, the control unit stores an acceleration value in a cell corresponding to a middle distance index by performing interpolation.

4. The electronically controlled suspension system of claim 3, wherein when the control unit estimates the acceleration value of the front wheel, which is stored in the cell positioned behind the location of the front wheel by the wheelbase distance as the acceleration value of the rear wheel, the acceleration value of the rear wheel is expressed as in [Equation 1] below and calculated by [Equation 1]

$$a_{w,RR} = a_{w,FRT}\text{Buffer}[k_n - \text{Wheelbase}] \quad \text{[Equation 1]}$$

($a_{w,RR}$ represents the acceleration value of the rear wheel, $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer).

5. The electronically controlled suspension system of claim 1, wherein the control unit compensates the estimated acceleration value of the rear wheel by using vehicle velocity information.

6. The electronically controlled suspension system of claim 5, wherein the storage unit has a vehicle velocity buffer,
   the vehicle velocity buffer is constituted by several cells, and the several cells are distinguished by a distance index,
   the control unit stores a vehicle velocity corresponding to the distance index in each of the several cells, and
   the vehicle velocity information is a vehicle velocity stored in the vehicle velocity buffer, and the acceleration value of the rear wheel which is compensated by the vehicle velocity information is in proportion to the vehicle velocity.

7. The electronically controlled suspension system of claim 6, wherein the acceleration value of the rear wheel, which is compensated by the vehicle velocity information is expressed as in [Equation 2] below and calculated by [Equation 2]

$$a_{w,RR} = a_{w,FRT}\text{Buffer}[k_n-\text{Wheelbase}] * \{v_x\text{Buffer}[k_n]/(v_x\text{Buffer}[k_n-\text{Wheelbase}])\} \quad \text{[Equation 2]}$$

($a_{w,RR}$ represents the acceleration value of the rear wheel, $a_{w,FRT}\text{Buffer}[k_n-\text{Wheelbase}]$ represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer, $v_x\text{Buffer}[k_n]$ represents the vehicle velocity of the front wheel, which is stored in the $k_n$-th cell storing the vehicle velocity at the current location of the front wheel in the vehicle velocity buffer, and ($v_x\text{Buffer}[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer).

8. The electronically controlled suspension system of claim 1, wherein the control unit compensates the estimated acceleration value of the rear wheel by using vehicle velocity information, and then compensates the acceleration value of the rear wheel compensated by the vehicle velocity information by using a vehicle specification.

9. The electronically controlled suspension system of claim 8, wherein the storage unit has a vehicle velocity buffer,
the vehicle velocity buffer is constituted by several cells, and the several cells are distinguished by a distance index,
the control unit stores a vehicle velocity corresponding to the distance index in each of the several cells,
the vehicle velocity information is a vehicle velocity stored in the vehicle velocity buffer, and
the acceleration value of the rear wheel which is compensated by the vehicle velocity information is in proportion to an acceleration constant, the acceleration constant being an acceleration size ratio of the front wheel and the rear wheel.

10. The electronically controlled suspension system of claim 9, wherein the acceleration value of the rear wheel, which is compensated by the vehicle specification is expressed as in [Equation 3] below and calculated by [Equation 3]

$$a_{w,RR}=a_{w,FRT}\text{Buffer}[k_n-\text{Wheelbase}]*\{v_x\text{Buffer}[k_n]/(v_x\text{Buffer}[k_n-\text{Wheelbase}])\}*\text{WheelGRatio} \quad \text{[Equation 3]}$$

($a_{w,RR}$ represents the acceleration value of the rear wheel, $a_{w,FRT}$Buffer[$k_n$-Wheelbase] represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer, $v_x$Buffer[$k_n$] represents the vehicle velocity of the front wheel, which is stored in the $k_n$-th cell storing the vehicle velocity at the current location of the front wheel in the vehicle velocity buffer, ($v_x$Buffer[$k_n$-Wheelbase]) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer, and WheelGRatio represents the acceleration size ratio (acceleration constant) of the front wheel and the rear wheel).

11. A method for estimating a rear wheel acceleration of an electronically controlled suspension system, comprising:
a distance based buffer using step in which a front wheel acceleration buffer is provided, the front wheel acceleration buffer is constituted by several cells, the several cells are distinguished by a distance index, an acceleration value of the front wheel corresponding to the distance index is stored in each of the several cells, and the acceleration value of a rear wheel is estimated as an acceleration value of the front wheel, which is stored in a cell positioned behind a location of the front wheel by a wheelbase distance.

12. The method of claim 11, wherein in the distance based buffer using step, the acceleration value of the rear wheel is estimated as the acceleration value of the front wheel, which is stored in a cell storing the acceleration value at a location acquired by subtracting a distance which is as large as a wheelbase from a cell storing the acceleration value at a current location of the front wheel.

13. The method of claim 12, wherein in the distance based buffer using step, in a case where the velocity or the acceleration of the vehicle increases, an acceleration value in a cell corresponding to a middle distance index is stored by performing interpolation.

14. The method of claim 13, wherein in the distance based buffer using step, the acceleration value of the rear wheel is expressed as in [Equation 4] below and calculated by [Equation 4]

$$a_{w,RR}=a_{w,FRT}\text{Buffer}[k_n-\text{Wheelbase}] \quad \text{[Equation 4]}$$

($a_{w,RR}$ represents the acceleration value of the rear wheel in the distance based buffer using step, and $a_{w,FRT}$Buffer[$k_n$-Wheelbase] represents the acceleration value of the front wheel, which is stored in a cell storing an acceleration value at a distance (location) acquired by subtracting the distance which is as large as the wheelbase from a $k_n$-th cell storing the acceleration value at the current location of the front wheel in the front wheel acceleration buffer).

15. The method of claim 11, further comprising a rear wheel acceleration compensating step based on a vehicle velocity, in which the acceleration value of the rear wheel estimated in the distance based buffer using step is compensated by vehicle velocity information.

16. The method of claim 15, wherein the distance based buffer using step has a vehicle velocity buffer,
the vehicle velocity buffer is constituted by several cells, the several cells are distinguished by a distance index, and a vehicle velocity corresponding to the distance index is stored in each of the several cells, and
the vehicle velocity information is a vehicle velocity stored in the vehicle velocity buffer, and the acceleration value of the rear wheel which is compensated by the vehicle velocity information is in proportion to the vehicle velocity.

17. The method of claim 16, wherein in the rear wheel acceleration compensating step based on the vehicle velocity, the acceleration value of the rear wheel, which is compensated by the vehicle velocity information is expressed as in [Equation 5] below and calculated by [Equation 5]

$$a_{w,RR}=a_{w,FRT}\text{Buffer}[k_n-\text{Wheelbase}]*\{v_x\text{Buffer}[k_n]/(v_x\text{Buffer}[k_n-\text{Wheelbase}])\} \quad \text{[Equation 5]}$$

($a_{w,RR}$ represents the acceleration value of the rear wheel acquired in the rear wheel acceleration compensating step based on the vehicle velocity, $a_{w,FRT}$Buffer[$k_n$-Wheelbase] represents the acceleration value of the rear wheel acquired in the distance based buffer using step, $v_x$Buffer[$k_n$] represents the vehicle velocity of the front wheel, which is stored in the $k_n$-th cell storing the vehicle velocity at the current location of the front wheel in the vehicle velocity buffer, and ($v_x$Buffer[$k_n$-Wheelbase]) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer).

18. The method of claim 11, further comprising:
a rear wheel acceleration compensating step based on a vehicle velocity, in which the acceleration value of the rear wheel estimated in the distance based buffer using step is compensated by vehicle velocity information; and a rear wheel acceleration compensating step based on a vehicle specification, in which the acceleration value of the rear wheel compensated by the vehicle velocity information in the rear wheel acceleration compensating step based on the vehicle velocity is compensated by vehicle specification.

19. The method of claim 18, wherein the distance based buffer using step has a vehicle velocity buffer, the vehicle velocity buffer is constituted by several cells, the several cells are distinguished by a distance index, and a vehicle velocity corresponding to the distance index is stored in each of the several cells, the vehicle velocity information is a vehicle velocity stored in the vehicle velocity buffer, and in the rear wheel acceleration compensating step based on the vehicle specification, the acceleration value of the rear wheel which is compensated by the vehicle velocity information is in proportion to an acceleration constant, the acceleration constant being an acceleration size ratio of the front wheel and the rear wheel.

20. The method of claim 19, wherein in the rear wheel acceleration compensating step based on the vehicle specification, the acceleration value of the rear wheel, which is compensated by the vehicle specification is expressed as in [Equation 6] below and calculated by [Equation 6]

$$a_{w,RR}=a_{w,FRT}\text{Buffer}[k_n-\text{Wheelbase}]*\{v_x\text{Buffer}[k_n]/(v_x\text{Buffer}[k_n-\text{Wheelbase}])\}*\text{WheelGRatio} \quad \text{[Equation 6]}$$

($a_{w,RR}$ represents the acceleration value of the rear wheel acquired in the rear wheel acceleration compensating step based on the vehicle specification, $a_{w,FRT}$Buffer$[k_n-\text{Wheelbase}]$ represents the acceleration value of the rear wheel acquired in the distance based buffer using step, $v_x$Buffer$[k_n]$ represents the vehicle velocity of the front wheel, which is stored in the $k_n$-th cell storing the vehicle velocity at the current location of the front wheel in the vehicle velocity buffer, ($v_x$Buffer$[k_n-\text{Wheelbase}]$) represents the vehicle velocity of the front wheel, which is stored in a cell storing the vehicle velocity at a distance (location) acquired by subtracting the distance which is as large as the wheelbase from a $k_n$-th cell storing the vehicle velocity at the current location of the front wheel in the vehicle velocity buffer, and WheelGRatio represents the acceleration size ratio (acceleration constant) of the front wheel and the rear wheel).

* * * * *